United States Patent
Benedetto et al.

(10) Patent No.: US 12,179,106 B2
(45) Date of Patent: Dec. 31, 2024

(54) LOCAL ENVIRONMENT SCANNING TO CHARACTERIZE PHYSICAL ENVIRONMENT FOR USE IN VR/AR

(71) Applicant: Sony Interactive Entertainment Inc., Tokyo (JP)

(72) Inventors: Warren Benedetto, San Mateo, CA (US); Yiwei Yang, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 462 days.

(21) Appl. No.: 17/472,653

(22) Filed: Sep. 12, 2021

(65) Prior Publication Data
US 2023/0083302 A1 Mar. 16, 2023

(51) Int. Cl.
A63F 13/5378 (2014.01)
G06F 3/01 (2006.01)
G06F 18/214 (2023.01)
G06V 10/25 (2022.01)
G06V 20/20 (2022.01)

(52) U.S. Cl.
CPC .......... *A63F 13/5378* (2014.09); *G06F 3/013* (2013.01); *G06F 18/214* (2023.01); *G06V 10/25* (2022.01); *G06V 20/20* (2022.01)

(58) Field of Classification Search
CPC .... A63F 13/5378; G06F 3/013; G06F 18/214; G06F 3/012; G06F 3/011; G06V 10/25; G06V 20/20; G06T 2210/04; G06T 2215/16; G06T 2219/2008; G06T 19/20
See application file for complete search history.

(56) References Cited

U.S. PATENT DOCUMENTS

| | | | |
|---|---|---|---|
| 10,628,982 B2* | 4/2020 | Simpkinson | G06T 11/60 |
| 11,210,857 B2* | 12/2021 | Rizvi | A63F 13/216 |
| 2012/0195471 A1 | 8/2012 | Newcombe et al. | |
| 2016/0026253 A1* | 1/2016 | Bradski | H04N 13/128 345/8 |
| 2020/0162526 A1 | 5/2020 | Miller | |
| 2020/0327737 A1 | 10/2020 | Powderly et al. | |
| 2021/0201581 A1* | 7/2021 | Xie | G06T 19/20 |
| 2021/0312716 A1* | 10/2021 | Xie | G06T 19/20 |

OTHER PUBLICATIONS

"International Search Report and Written Opinion", dated Jan. 17, 2023, from the counterpart PCT application PCT/US22/76256.

* cited by examiner

*Primary Examiner* — Ronald Laneau
(74) *Attorney, Agent, or Firm* — John L. Rogitz; John M. Rogitz (57) ABSTRACT

A user's environment is scanned and an augmented reality game such as a treasure is set up based on the scan. The user needs to use a phone to uncover clues in a game environment that is customized to user's own personal real-world environment, which is discovered using SLAM or GPS so that a map of furniture can be built. The game hides a virtual object behind a virtualized image of the real-world furniture. Machine learning may be used to train a model with common objects and where interesting hidden spaces could exist. Given the user's inputted data, real world physical room data and objects are used to determine a likely location to hide a virtual object.

14 Claims, 9 Drawing Sheets

LOCAL ENVIRONMENT SCANNING TO CHARACTERIZE PHYSICAL ENVIRONMENT FOR USE IN VR/AR

FIELD

The present application relates generally to Local Environment Scanning to Characterize Physical Environment for Use in VR/AR.

BACKGROUND

As understood herein, multiple computer gamers may play the same computer game in a room wearing headsets that overlay virtual objects onto real world objects seen through the headsets (augmented reality). Present principles are directed to enhancing such game play.

SUMMARY

Accordingly, a system includes at least one computer medium that is not a transitory signal and that in turn instructions executable by at least one processor to identify physical objects in a space in real world, identify at least one void in the space, and locate at least one virtual object in a virtual location of the void. The instructions are executable to selectively present the virtual object on at least one augmented reality (AR) display through which the physical objects can be seen.

In some embodiments, the instructions can be executable to classify at least some of the physical object, and based at least in part on classifying physical objects, identify the void as being suitable to present the virtual object in.

In example implementations the instructions may be executable to present on the AR display at least one clue pertaining to where the virtual object is located.

If desired, the instructions can be executable to identify a point of gaze (POG) a wearer of the AR display, and based at least in part on the POG, present on the AR display at least one clue pertaining to a location of the virtual object. The instructions may be executable to, responsive to identifying that the POG is directed toward the virtual object, present the virtual object on the AR display.

In some examples, the instructions can be further executable to identify physical objects in a space in real world, identify a location in the space of a user wearing an augmented reality (AR) or virtual reality (VR) headset, and present on the headset a virtualization of the space. The instructions may be executable to, responsive to action of a virtualized character of the user, present a virtualized object representing one of the physical objects in a location in the virtualization of the space to support the virtualized character.

In another aspect, an apparatus includes at least one computer medium that is not a transitory signal and that in turn instructions executable by at least one processor to identify physical objects in a space in real world, identify a location in the space of a user wearing an augmented reality (AR) or virtual reality (VR) headset, and present on the headset a virtualization of the space. The instructions may be executable to, responsive to action of a virtualized character of the user, present a virtualized object representing one of the physical objects in a location in the virtualization of the space to support the virtualized character.

In another aspect, a method includes generating a digital map of a real-world space and objects therein using images of the space and using the digital map for execution of a virtual reality (VR) or augmented reality (AR) computer simulation.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
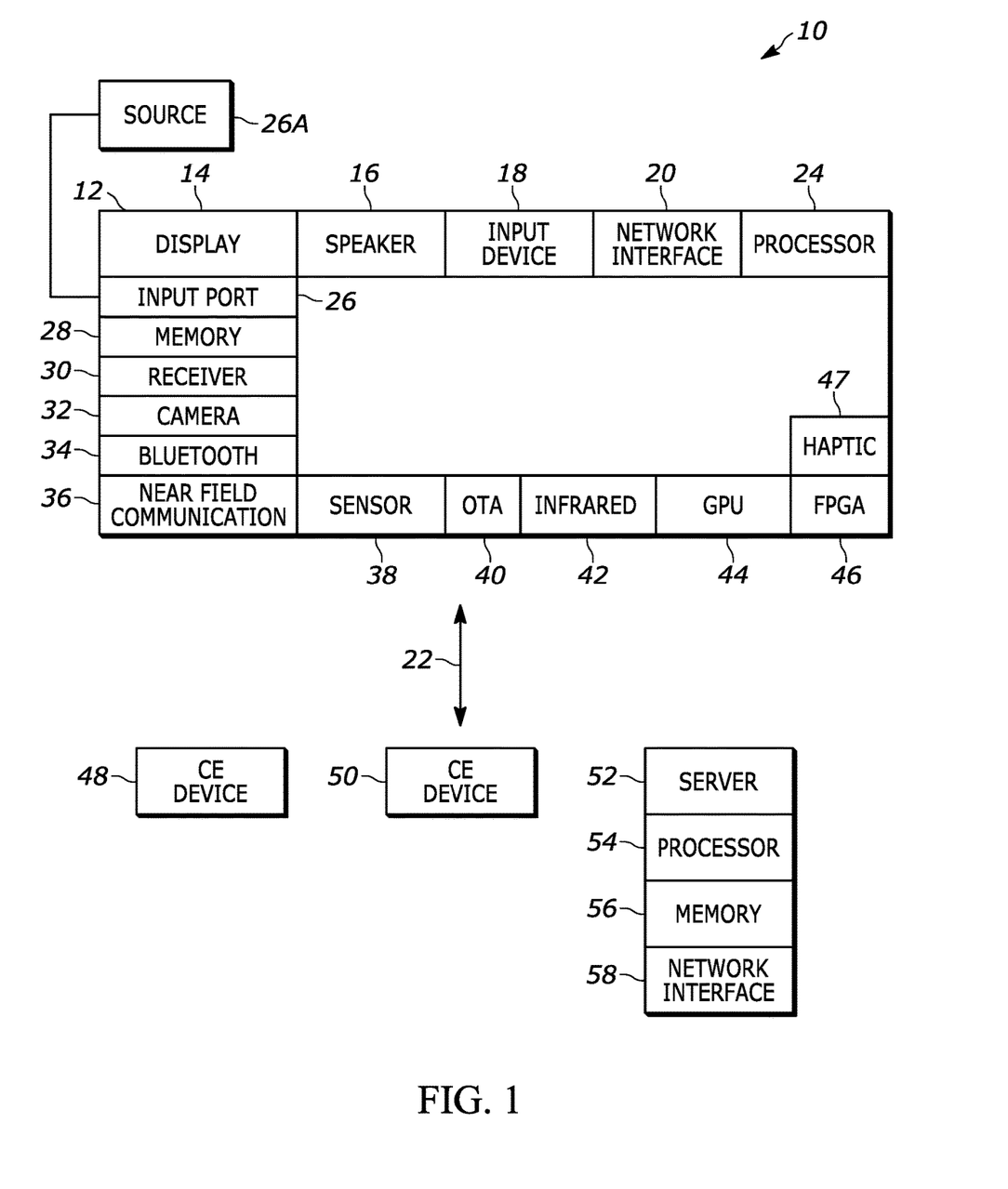
FIG. 1 is a block diagram of an example system including an example in accordance with present principles.

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
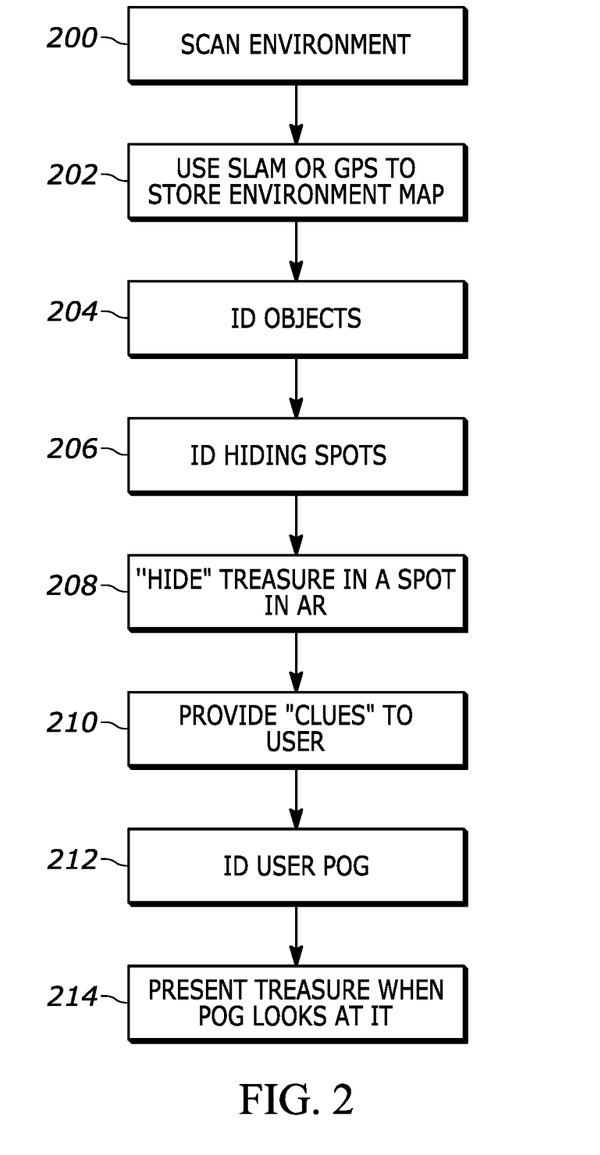
FIG. 2 illustrates example logic in example flow chart format.

FIG. 2 illustrates example specific logic consistent with present principles, with more generalized logic to follow. Commencing at block 200, a user's physical real-world environment is scanned using, e.g., one or more RGB or IR or laser cameras or other imagers such as acoustic (sonic)-based imaging. The resulting images are mapped at block 202 into a data structure using global positioning satellite (GPS) location data associated with each object imaged and/or simultaneous localization and mapping (SLAM).

Moving to block 204, objects in the real-world mapping are identified using, e.g., machine vision/machine learning (ML) techniques. For example, a ML model can be trained on a training set of object images correlated with ground truth classification tags to learn to recognize objects in images and output classifications of those objects. Accordingly, a digitized SLAM data structure is generated of the user's physical real-world environment such as a living room with physical objects such as couches, chairs, TVs, and the like associated with classification tags.

Proceeding to block 206, hiding spots in the SLAM data structure (i.e., the user's real world physical environment) are identified according to further disclosure below, and at block 208 items such as virtual reality (VR) objects representing, e.g., treasure are digitally hidden in (associated with in the data structure) the hiding spots. A hiding typically includes a void in or around a real-world object.

Moving to block 210, if desired clues may be presented on a display associated with the user, such as a VR/AR head-mounted display (HMD) or cell phone display. In an example, the user's point of gaze (POG) is identified at block 212 using, e.g., images from an internal camera of a HMD worn by the user, and responsive to the POG being directed at the hiding spot, the "treasure" may be presented on the display as located in the hiding spot. In this example, the logic of FIG. 2 facilitates a computer treasure hunt game customized to user's own personal real-world environment.

Figure 3:
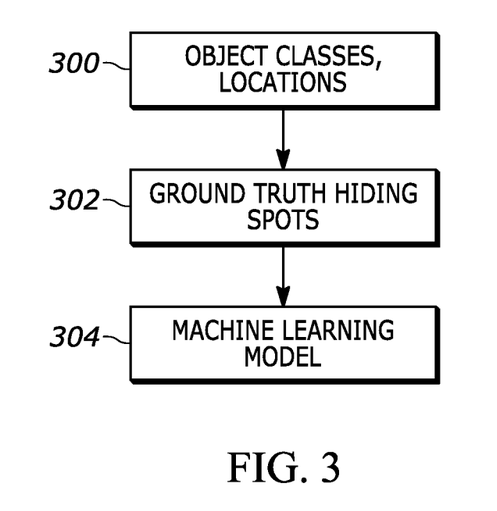
FIG. 3 illustrates training a machine learning (ML) model.
Figure 4:
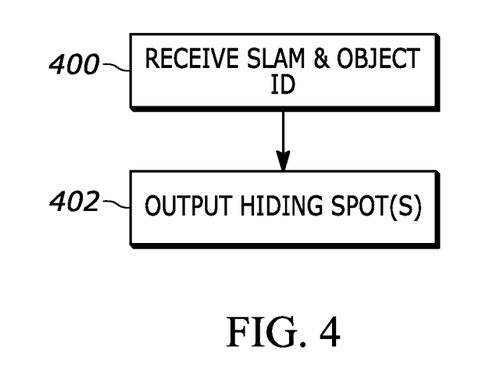
FIG. 4 illustrates example logic for using the ML model.

FIG. 3 illustrates additional principles consistent with disclosure herein. Commencing at block 300, a training set of object classifications and locations along with, at block 302, ground truth hiding spot locations in each object class are input to a ML model at block 304 to train the model. Then, in operation at block 400 the above-described SLAM data structure along with the classifications of the objects therein is received by the ML model, which outputs, at block 402, hiding spots in the SLAM data structure at which one or more VR objects may be hidden.

Figure 5:
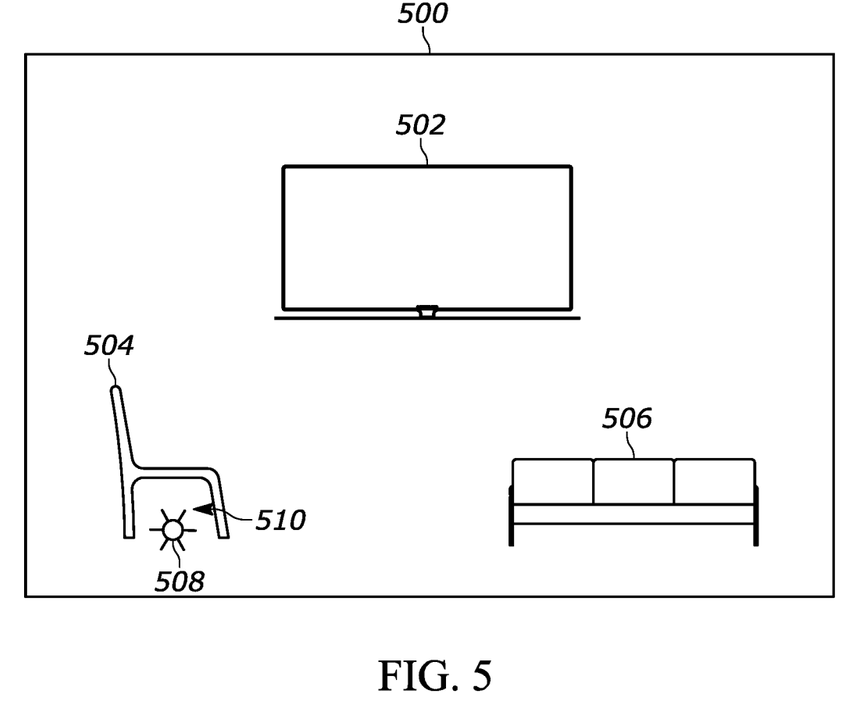
FIG. 5 illustrates an example augmented reality (AR) display.

FIG. 5 illustrates a SLAM data structure that may be presented on a display 500, such as a VR/AR HMD. In the SLAM model of the user's real-world environment, a TV 502 appears nearby a chair 504 and a couch 506, which are virtual representations of the real-world environment with virtual objects arranged in the same geometric layout virtually as they are physically. A virtual object 508, in this case, a diamond with no counterpart in the user's real world, is hidden in the hiding space 510 under the chair 504. However, the virtual object 508 may not be immediately presented on the display 500 until the user "find" it, e.g., by directing the user's POG at the hiding space 510 or by other user action such as responding to a query correctly, operating an input device to hover a cursor over the chair, thing the chair on the display, etc.

Figure 6:
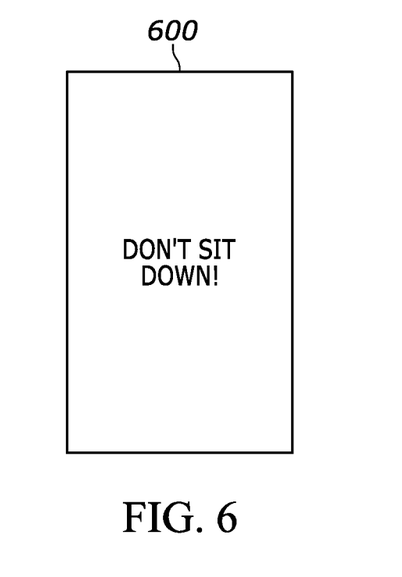
FIG. 6 illustrates an example user interface (UI) on a companion device to the display in FIG. 5.

FIG. 6 illustrates a clue 600 that may be presented on a display such as the display 500 or any other display herein, including a cell phone display. The clue may suggest the location of the virtual object 508 or otherwise alert the user with possibly useful information about where to find the treasure.

Figure 7:
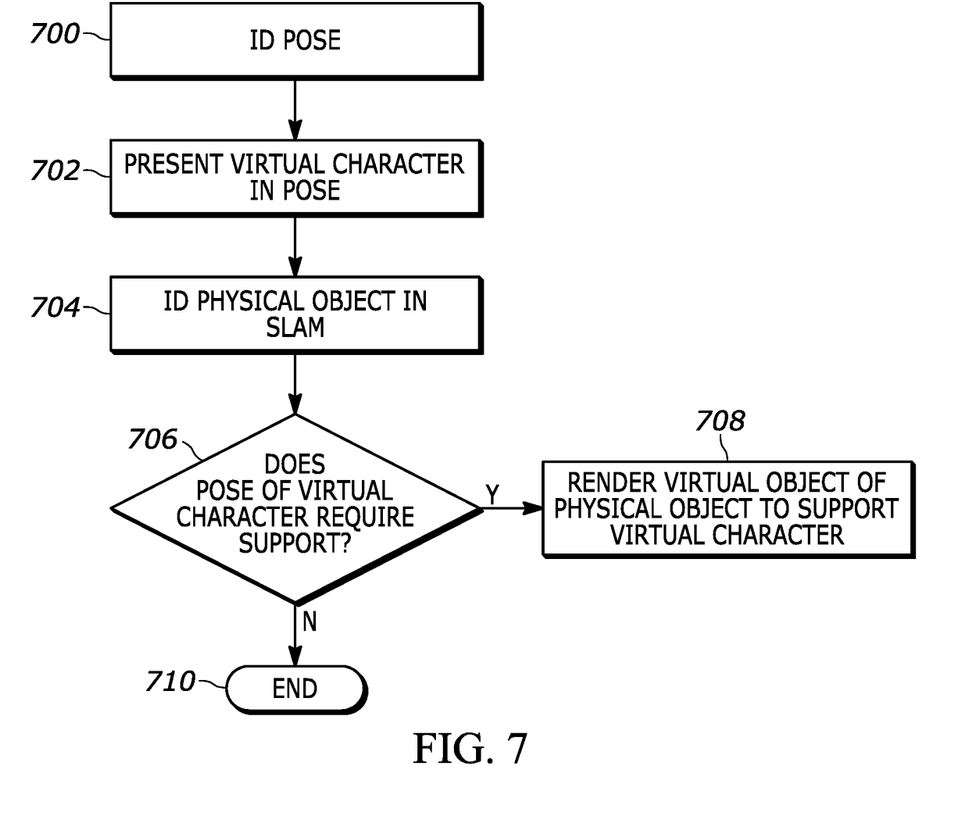
FIG. 7 illustrates additional example logic in example flow chart format.
Figure 8:
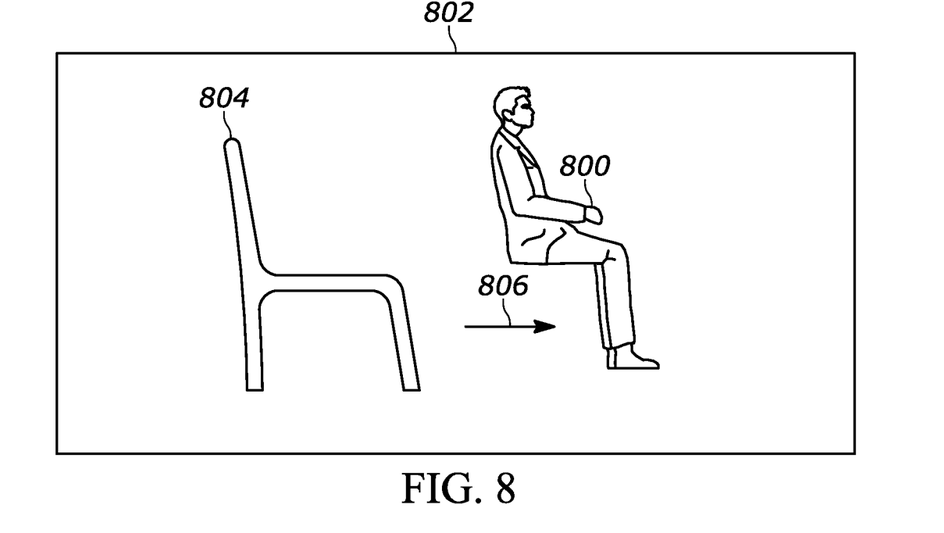
FIG. 8 illustrates an example UI consistent with FIG. 7.

FIGS. 7 and 8 illustrate an aspect in which a camera images the user and the user's pose is estimated to build a VR character of the user, such as a stick figure, that is animated in virtual space according to the user's motions in the real world. If the user attempts to sit in the real world, the VR character may lack a virtual object on which to sit, so an object from the real world can be virtualized and placed under the VR character in VR space. In this way the VR character is not displayed unrealistically as sitting or lying on empty space.

Commencing at block 700, the pose of the user is identified. Moving to block 702, the VR character of the user is presented on a display such as a HMD in the pose of the real-world user. Moving to block 704, one or more physical objects are identified using the SLAM data structure, and if it is determined at state 706 that the pose of the virtual requires support where none exists in virtual space, a virtual object representing the real-world objects is "pulled" into VR space at block 708 to support the virtual character. On the other hand, the logic may end at stat 710 if no support is required in VR space.

FIG. 8 illustrates. A virtual character 800 of a real-world user in the pose of the real-world user is presented on a display 802 such as any display herein. Assume the test at state 706 in FIG. 7 indicates that a support is required, in this case, to support a virtual character in a pose that is about to sit. In this case, a virtual object 804 such as a chair is moved under the user as indicated by the arrow 806, with the virtual object 806 being based on an object in the SLAM data structure.

Additional use cases of the techniques in FIGS. 7 and 8 are as follows. The type of virtual object that is generated can be context-sensitive to the rest of the virtual world. For example, if an avatar is in a jungle, it would be unusual for a chair to suddenly appear. Instead, a natural object such as a tree stump or boulder or other appropriate sitting object would be generated responsive to the setting being a nature setting such as a jungle.

Or if a character is laying down in a living room environment, it would be more appropriate to generate a virtual couch than a virtual bed responsive to being in the living room environment, even though either could technically be laid upon.

Generated virtual objects may have awareness of the other objects in the virtual world. For example, if a person sits while the avatar is standing next to a house plant, it would be silly for the avatar to sit on the houseplant, or for a chair to be generated on top of the houseplant. In these cases, the position of the object in the virtual world is shifted to the closest available space to make room for the virtual object that will be generated to accommodate the posture, or vice versa.

There may be plenty of existing objects in a scene which an avatar may sit on. For example, in a jungle environment, there may already be a boulder or long upon which an avatar can sit. If a person engages in a sitting posture near one of these existing virtual objects, the avatar should be able to sit on the existing object without needing a new one generated for it.

This implies a way of marking up virtual objects in a scene with posture-related characteristics such as "sittable", "reclinable", etc. This way, developers can build environments that support posture-based interactions without the need to generate new objects on-the-fly. The stump and boulder have properties that indicate they are sittable, whereas trees in the scene have properties that indicate they are not sittable.

Furthermore, certain objects may support multiple postures. For example, a couch or a bed can support both sitting and laying. Therefore, a person whose posture changes from a lying to sitting position, or vice versa, would not trigger a new virtual object if the avatar was on a couch or bed. However, if an avatar is sitting on a chair, and the person's posture changes to laying, the avatar should not try to lay on the chair. Instead, a more posture-appropriate object should be generated.

There will also need to be some degree of flexibility (literally and figuratively) in the virtual objects which are generated based on posture. For example, if the sitting posture has the person's spine leaning backwards at a 15-degree angle, it wouldn't be appropriate to insert a straight-backed dining chair beneath the avatar. Instead, the virtual chair should be one which can physically accommodate the posture, such as a desk chair with a reclining back, or a stuffed armchair or couch that allows for some "give" in the posture responsive to the real-world person having a slightly reclined sitting angle.

The virtual objects should have some range of flexibility with regard to the postures which they support. For example, a desk chair might support a spine posture between 0 and 15 degrees, and a lower leg posture of 45 to 270 degrees. As long as the person's posture remains within that range, then the avatar can realistically be sitting in that chair. However, if the spine posture is greater than 30 degrees and the lower leg posture is greater than 250 degrees, then the person is reclining too far to realistically be in a desk chair. Instead, the virtual object should be changed to some sort of reclining chair.

Postures of multiple people and their position relative to each other can be combined together to generate more complex virtual object/avatar interactions. For example, if there are two people whose postures are both sitting, and their avatars are next to each other in close proximity, then a virtual couch could be inserted, with both avatars sitting next to each other on the couch (as opposed to sitting in separate chairs).

If two avatars are sitting facing each other within close proximity, then a virtual table and chairs could be inserted, as if the avatars are dining together.

The proximity and position of the avatars in the virtual world would be combined with individual users' posture data to generate the virtual object. For example, Person A and Person B may be in different homes in different cities, but their avatars are face-to-face in the virtual world. Because the avatars are close, when Person A and Person B sit in their respective homes, the avatars would appear face-to-face across a virtual table.

On the other hand, the proximity and position of people in the physical world should be decoupled from the virtual objects generated for their avatars. Just because two people are sitting next to each other on a couch in real life doesn't mean their avatars are next to each other in the virtual world. They may be across the room, or in entirely different environments. Therefore, the posture data from two people in the same physical room should be treated separately in the virtual world.

Figure 9:
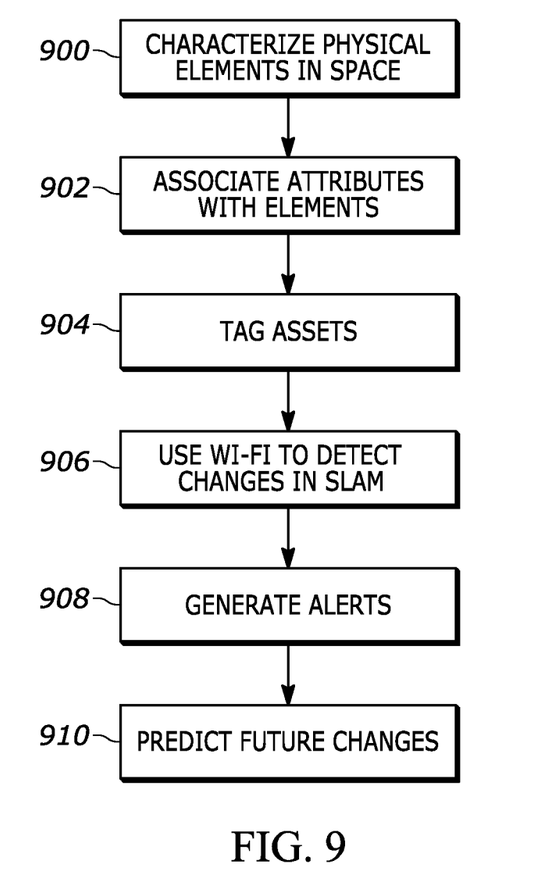
FIG. 9 illustrates additional example logic.

Refer now to FIG. 9 for a generalized understanding of present principles. Commencing at block 900, physical elements in the user's space are characterized for augmentation models can snap to. This may be done as explained previously, by constructing a SLAM map and classifying objects in the map. Inventory for the space, which can be managed in cloud, can associate with each asset type different attributes at block 902. Such attributes can be material attributes that are static (e.g., hardness, temperature, color, etc.) and dynamic (doors explode in a certain way, fragments in a certain way, bar with glasses that shatter if shot, etc.)

Physical assets are then tagged at block 904. Assets can be anything the user can react to and touch and can be tagged in one way that learned over time so when users enter a new game, they know what to expect. For instance, physical assets that may be safety hazards can be tagged as such and the game paused when a user approaches such assets.

Assets can also be tagged to indicate whether they do not move (such as furniture) or move (toys/people), in response to which latter tags an opacity of a HMD may be decreased to the user can better see the moving object, or a safety sound or tactile signal may be generated.

Block 906 indicates that changes in the SLAM map from, e.g., moving objects may be detected using, in one embodiment, Wi-Fi. Alerts can be generated at block 908 of such changes in accordance with disclosure below. Changes also can be predicted at block 910 of future speed and location of objects based on their current motion.

Accordingly, when a user who may be wearing a HMD enters a physical room, the HMD by means of an external-facing camera can detect interactable physical objects that the user can interact with as part of game.

For example, bookshelves can be recognized as an object that is laced in the virtual game as, e.g., a barrier to hide something, such as between bookshelves and walls. A virtual piece of paper with game hints to get to the next level may be hidden behind the bookshelf.

Because the physical environment is accurately mapped the game can know how big a gap there would be between shelf and wall, and whether a user is physically able to reach within the gap to trigger a reaction for a game object to appear.

If a physical object is tagged as "hot" the virtual game can either warn the user away from the object or simply not direct the user toward the object. Such tagging can be facilitated using heat detectors such as IR detectors as part of the SLAM generation hardware.

Further, some asset classes are inherently dangerous, and can be tagged as such so that the game will not be directed users toward an inherently dangerous class of object.

If the SLAM process detects hinges, the game can surmise that a door exists that can be opened and something virtual can be placed in the opening.

In effect the characteristics of the lay area are detected to guarantee safety for the user to interact with, so it is no longer necessary for user to confirm and draw a play area for a given space. This opens up the play area to be outside of house or in social environment, then game developers can be given ways to manipulate the dynamic play areas.

A calibration GUI can be provided, e.g., on the user's HMD or on a physical display such as a TV to enable a user to physically touch a surface that the user thinks is a hard object that can be utilized as a game object to confirm such possible use. An object can be clicked on to ignore it in the game in such a GUI.

Wi-Fi may be used to detect objects and changes in location of objects in a real-world space. For example, using Wi-Fi, it may be determined whether enough space in a drawer exists to "hide" a virtual object therein. A camera with object ID would still be used as well such that a combination of sensors may be employed and integrated.

An example is a virtual escape room a user can enter and be informed by a game that somewhere in this room, the user has the option to open a first element, then a second element. Elements of environment are thus used as elements of a game.

Social environments with multiple people also can be sensed solving the same puzzle in the same game space. Multi-sensing SLAM with multiple people can be used for such a purpose such that the HMDs of each player communicate with each other to share their knowledge. Broadly, multiple devices are used for sensing.

Wi-Fi routers fill space with radio waves. These waves bounce off of people and objects in the room. This allows us to understand where a person or people may be located in the room. By definition, this also means we can detect where people are not located in the room. By tracking peoples' movements over time, we can build up a 3D spatial map of the boundaries of the room, location of furniture like coffee tables or couches, etc. This data can then be used to automatically generate (or at least suggest) boundaries for VR, to help people spatially orient themselves and stay out of danger, without needing to manually indicate boundaries in the room. It can also be used to determine the size and dimensions of the room, the highest-traffic areas of the room, whether there is a new obstruction that was previous undetected (i.e., someone moved or added a piece of furniture or other large object), and other important signals. It can also be used to determine when someone enters or exits the room. The advantage of this over simple cameras is that it can map the spaces that aren't visible to cameras due to occlusion, lighting, etc.

In order for VR—especially untethered VR that offers free movement through space—to be safe and enjoyable, the player and the system needs to have an awareness of the environment in which the player will be moving. This includes the size and dimensions of the playable space, as well as any obstacles in the space, such as furniture.

Simply having the player map out the physical space in VR by manually indicating, through in-VR drawing or other means, where the boundaries and obstacles in the environment are located introduces friction into the initial setup and onboarding process for VR. It also typically doesn't account for changes in the environment, such as a piece of furniture being moved to a new location, or the introduction of a temporary but significant object or entity into the environment, such as a large toy or another person.

Using only cameras to analyze the space for boundaries and obstacles is subject to limitations due to occlusion, lighting conditions, and other variables. The introduction of cameras into the home also presents a technical setup challenge for novice users, as well as rightly causing concerns about privacy.

Figure 10:
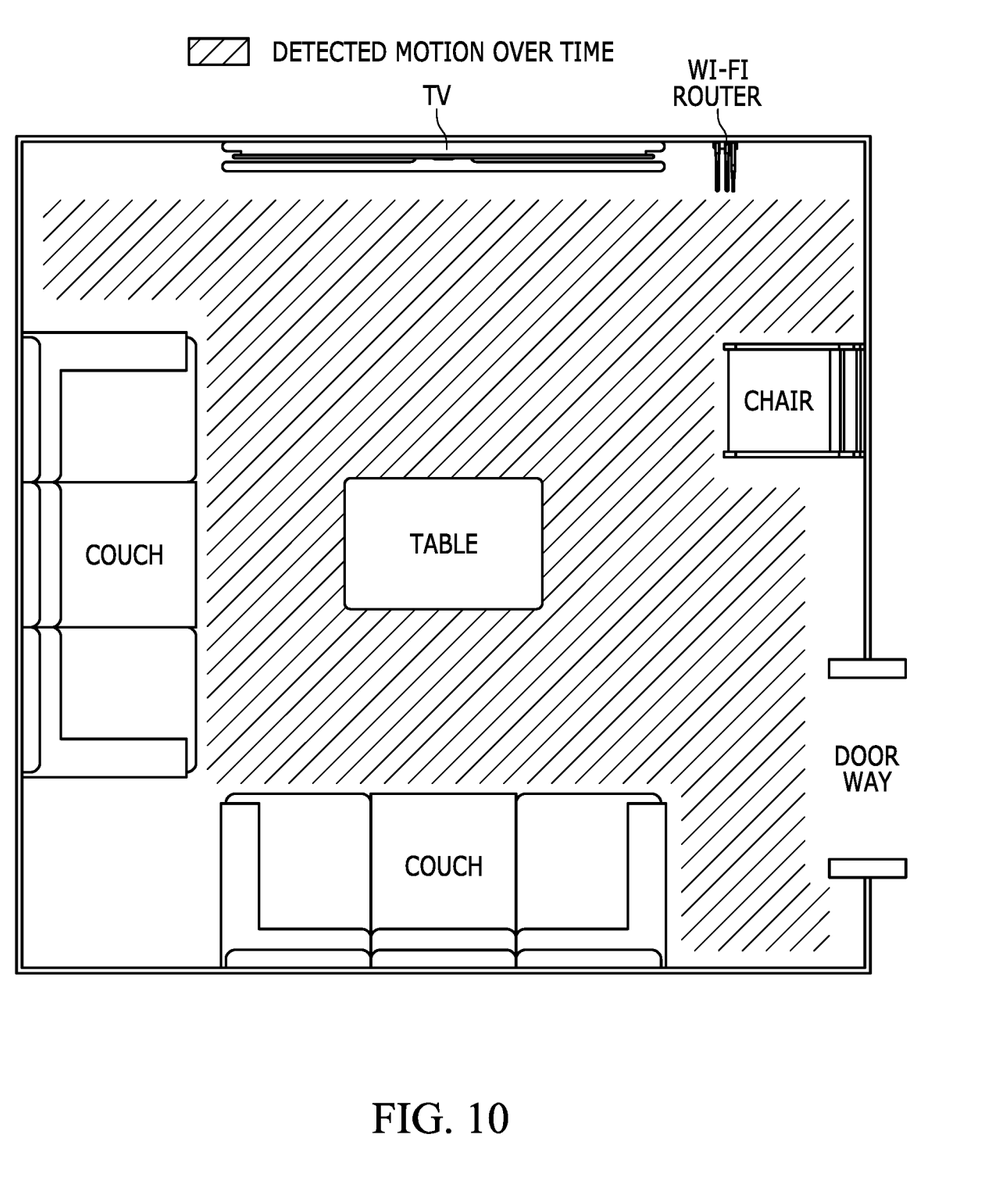
FIGS. 10-12 illustrate using Wi-Fi.
Figure 11:
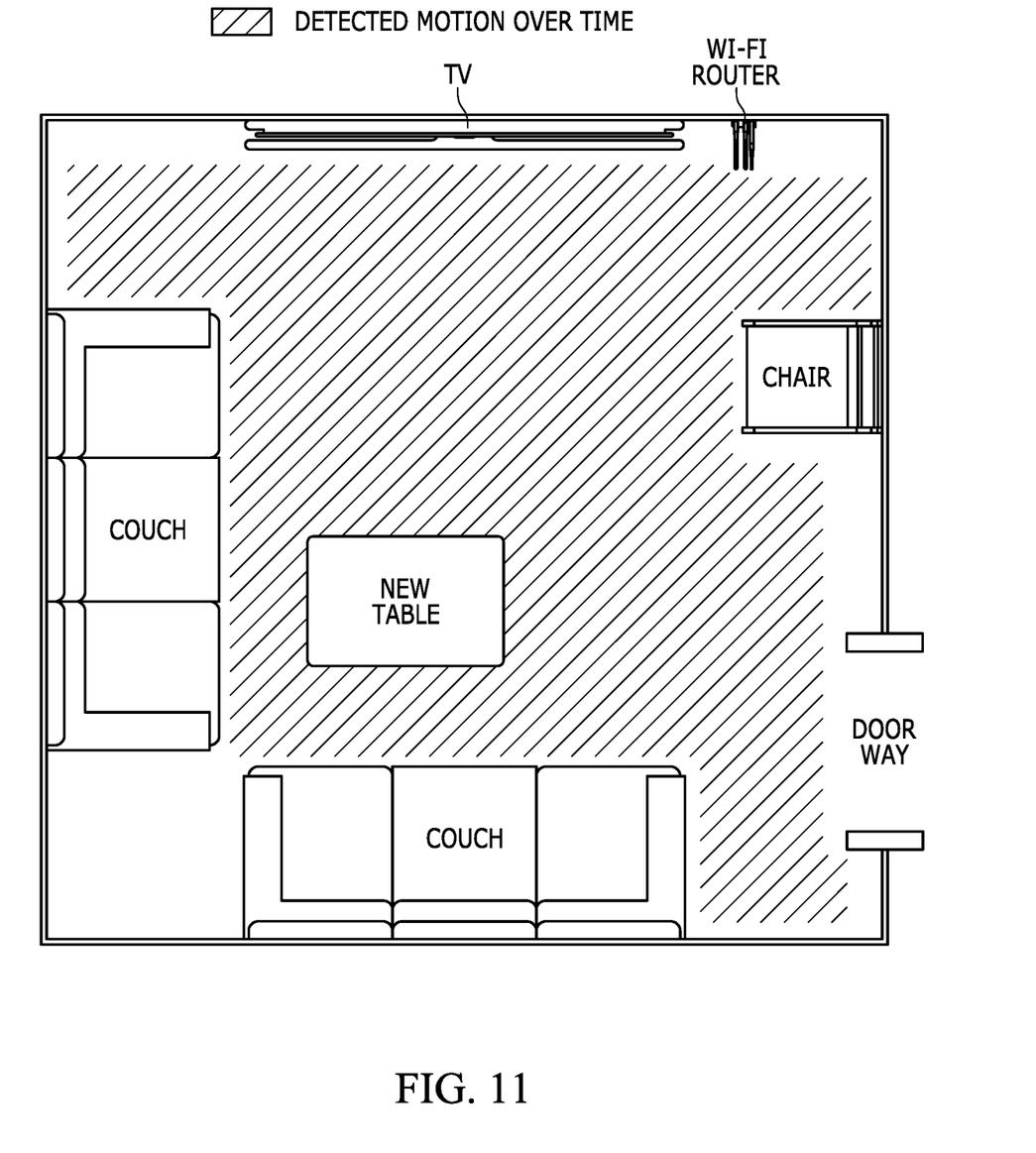
Figure 12:
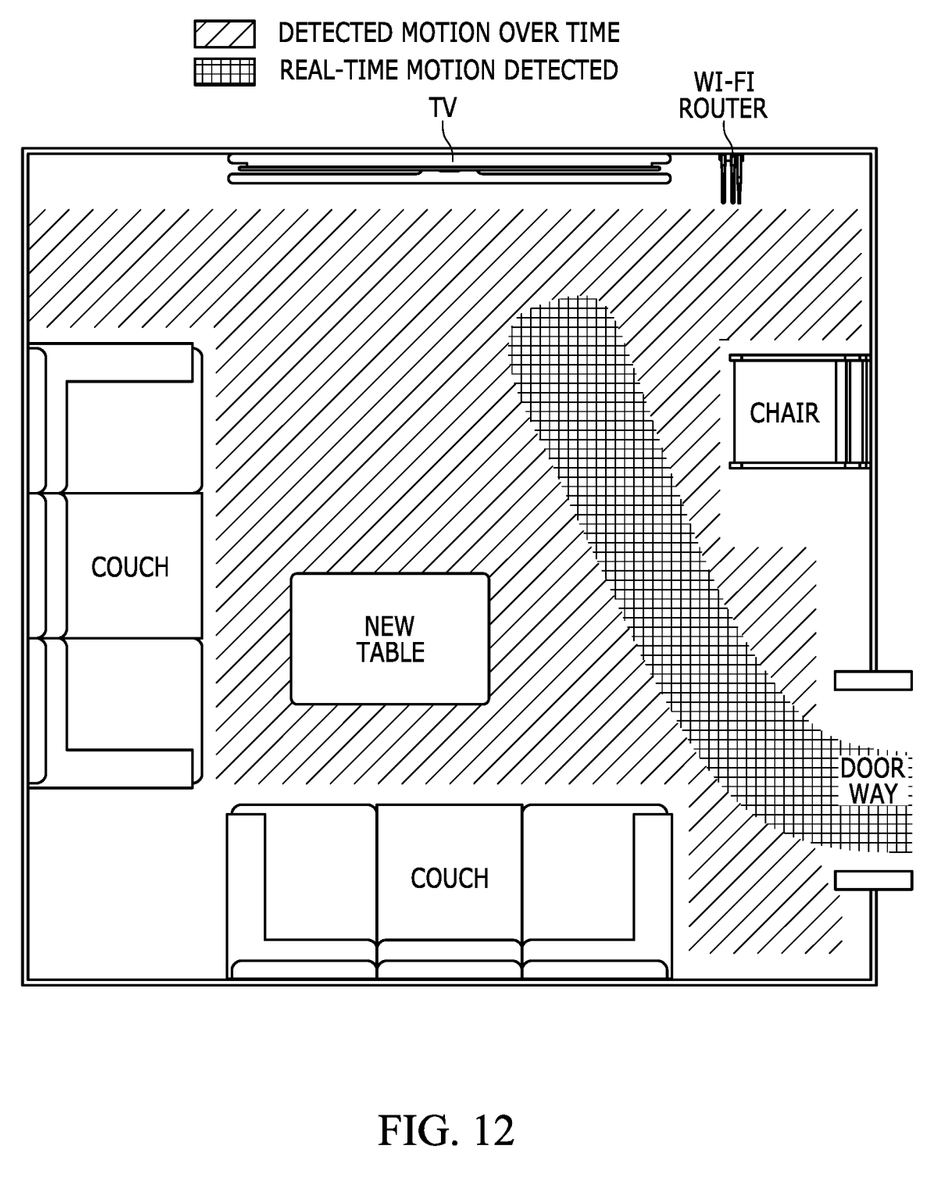

Accordingly, and turning now to FIGS. 10-12, Wi-Fi recognition is used to dynamically create 3D spatial maps of a room layout based on a longitudinal sampling of movement data. Furthermore, this data is combined with real-time movement detection to further enhance the safety and gameplay of VR.

Wi-Fi recognition allows detection of human movement and activity in a space by measuring the ways in which Wi-Fi signals deform and bounce around the moving person. This technology can recognize not just movement, but also the type of movement, and the position, for example, bending, walking, sitting, squatting, waving, etc.

By detecting, recording, and analyzing this movement over time, it is possible to create a 3D map of a space by "filling in" all the places where people move in the space. This also allows us to create the inverse: all the places in the room that people don't move. Over time, the system comes to understand the boundaries of the room such as walls, railings, etc. When combined with movement detection like sitting, it will also come to understand where furniture such as couches, chairs, ottomans, etc. are located, as illustrated in FIG. 10.

This spatial data can then be used in VR to automatically generate (or at least suggest) boundaries for safe play. The system will know, without any input or setup from the player, the size, and dimensions of the room, as well as the location of furniture and other obstacles. If the user strays near these areas which immersed in VR, the system can proactively warn the user of impending collision or other danger.

Once the system has an understanding of the geometry and geography of the room, it can also detect anomalies or changes in that data. For example, if there is typically a coffee table in the center of the room, the longitudinal movement data would show no movement through the area of the room where the coffee table is located. If the coffee table is moved, and there is suddenly movement data detected in that previously-inaccessible space, the system could use this understanding to take proactive action as illustrated in FIG. 11. This might include warning the user on next VR use that something in the environment has changed, triggering a rescan or remapping of the environment by increasing the rate of Wi-Fi movement data capture, or some other adjustment.

Wi-Fi recognition can also be used to detect real-time non-player movement in the room. For example, it can detect when someone enters the room, using that data to warn the player that someone is there as illustrated in FIG. 12. It can detect relative position of people in the room, like if a child wanders too close to the player and is in danger of being hit. It can detect when someone enters a room and sits down, implying that there may be someone watching the player play. This can be used to offer asymmetric play or play/watch opportunities, such as turning on a spectator view on the television when people are in the room. The opposite can also be true, detecting when a sitting figure stands and exits the room, turning off the TV and therefore saving energy and reducing heat in the room.

There are several advantages to using Wi-Fi recognition to map the space for VR. These include:
- The mapping can be done from the moment a console is turned on for the first time, regardless of whether the user has VR or not. If the user purchases a VR headset in the future, the space will already be mapped, therefore lowering the friction for onboarding.
- Unlike cameras, Wi-Fi recognition can map areas that are not visible to the camera or may be poorly lit or too far for the camera to accurately see.
- Because aggregate, anonymized movement data over time is used, it is much less invasive from a privacy perspective, compared to cameras.
- Unlike cameras or manual boundary definition, Wi-Fi recognition requires no special setup, pairing, wiring, or other configuration. It "just works."

While the particular embodiments are herein shown and described in detail, it is to be understood that the subject matter which is encompassed by the present invention is limited only by the claims.

What is claimed is:

1. An apparatus comprising:
at least one computer storage comprising instructions executable by at least one processor to:
identify physical objects in a space in real world;
identify at least one void in the space;
locate at least one virtual object in a virtual location of the void; and
selectively present the virtual object on at least one augmented reality (AR) display through which the physical objects can be seen.

2. The apparatus of claim 1, wherein the instructions are executable to:
classify at least some of the physical objects; and
based at least in part on classifying physical objects, identify the void as being suitable to present the virtual object in.

3. The apparatus of claim 1, wherein the instructions are executable to:
present on the AR display at least one clue pertaining to where the virtual object is located.

4. The apparatus of claim 1, wherein the instructions are executable to:
identify a point of gaze (POG) a wearer of the AR display; and
based at least in part on the POG, present on the AR display at least one clue pertaining to a location of the virtual object.

5. The apparatus of claim 4, wherein the instructions are executable to:
responsive to identifying that the POG is directed toward the virtual object, present the virtual object on the AR display.

6. The apparatus of claim 1, comprising the at least one processor.

7. The apparatus of claim 1, wherein the instructions are executable to:
identify physical objects in a space in real world;
identify a location in the space of a user wearing an augmented reality (AR) or virtual reality (VR) headset;
present on the headset a virtualization of the space;
responsive to action of a virtualized character of the user, present a virtualized object representing one of the physical objects in a location in the virtualization of the space to support the virtualized character.

8. An apparatus comprising:
circuitry configured to:
identify physical objects in a space in real world;
identify a location in the space of a user wearing an augmented reality (AR) or virtual reality (VR) headset;
present on the headset a virtualization of the space;
responsive to action of a virtualized character of the user, present a virtualized object representing one of the physical objects in a location in the virtualization of the space to support the virtualized character as the virtual character sits on the virtualized object.

9. The apparatus of claim 8, wherein the circuitry is configured to:
identify physical objects in a space in real world;
identify at least one void in the space;
locate at least one virtual object in a virtual location of the void; and
selectively present the virtual object on at least one augmented reality (AR) display through which the physical objects can be seen.

10. The apparatus of claim 8, wherein the circuitry is configured to:
classify at least some of the physical objects; and
based at least in part on classifying physical objects, identify the void as being suitable to present the virtual object in.

11. The apparatus of claim 9, wherein the circuitry is configured to:
present on the AR display at least one clue pertaining to where the virtual object is located.

12. The apparatus of claim 9, wherein the circuitry is configured to:
identify a point of gaze (POG) a wearer of the AR display; and based at least in part on the POG, present on the AR display at least one clue pertaining to a location of the virtual object.

13. The apparatus of claim 12, wherein the circuitry is configured to:
responsive to identifying that the POG is directed toward the virtual object, present the virtual object on the AR display.

14. The apparatus of claim 8, wherein the circuitry comprises at least one processor.

* * * * *